United States Patent [19]

Igawa et al.

[11] Patent Number: 4,933,664
[45] Date of Patent: Jun. 12, 1990

[54] THEFT PREVENTION DEVICE FOR AUTOMOBILES

[75] Inventors: Yoshiharu Igawa; Masahiro Kunitachi, both of Fujisawa, Japan

[73] Assignee: Shiroki Kinzoku Kogyo Kabushiki Kaisha, Fujisawa, Japan

[21] Appl. No.: 243,731

[22] Filed: Sep. 13, 1988

[30] Foreign Application Priority Data

Sep. 30, 1987 [JP] Japan .................. 62-247345

[51] Int. Cl.⁵ ..................... B60Q 1/00; B60R 25/04
[52] U.S. Cl. .................... 340/425.5; 340/426; 340/429; 340/430; 307/10.3; 307/10.6
[58] Field of Search .................. 340/63-65, 340/527, 528, 541, 542, 566, 550, 545, 590, 825.31, 825.32, 425.5, 426, 429, 430; 307/9, 10 R, 10 AT, 10.1-10.3, 10.6; 180/287, 271, 282, 283, 173

[56] References Cited

U.S. PATENT DOCUMENTS

| | | | |
|---|---|---|---|
| 3,858,175 | 12/1974 | Kopera, Jr. | 340/63 |
| 3,866,168 | 2/1975 | McGuirk, Jr. | 340/63 |
| 3,997,870 | 12/1976 | Horvath | 340/63 |
| 4,205,300 | 5/1980 | Ho et al. | 340/65 |
| 4,543,568 | 9/1985 | Hwang | 340/64 |

Primary Examiner—Donnie L. Crosland
Attorney, Agent, or Firm—Schwartz & Weinrieb

[57] ABSTRACT

An automobile theft prevention device has an alarm circuit for intermittently energizing a horn, a sensor for detecting a monitored action; and a control unit for controlling the alarm circuit so as to intermittently energize the horn when the monitored action is detected by means of the sensor during a period of time after an automobile door is locked according to a predetermined procedure and until the automobile door is properly unlocked.

6 Claims, 4 Drawing Sheets

THEFT PREVENTION DEVICE FOR AUTOMOBILES

FIELD OF THE INVENTION

The present invention relates to a theft prevention device for an automobile, and more particularly to an automobile theft prevention device for energizing a horn so as to produce an alarm when there is an attempted theft during a period of time after a door of the automobile has been locked through means of a predetermined procedure and until it is unlocked using a proper means such as, for example a key to the door lock or the like (for example, when a window glass panel is broken during a period of time after an automobile door has been locked by means of using a key within the door, and before it is unlocked by again using the key).

BACKGROUND OF THE INVENTION

Conventional theft prevention devices of the type described above are usually constructed such that they energize the horn continuously once the automobile is subjected to an attempted theft.

In certain situations, a horn alarm set off by means of an attempted automobile theft may be mistaken by nearby people as a legitimate use of the horn, and therefore not be recognized as an intended theft alarm. When this happens, some parts of the automobile or the automobile itself may be stolen.

OBJECT OF THE INVENTION

It is an object of the present invention to provide an automobile theft prevention device which is capable of clearly and reliably informing nearby people of an alarm resulting from an attempted automobile theft.

SUMMARY OF THE INVENTION

According to the present invention, there is provided an automobile theft prevention device comprising: an alarm circuit for intermittently energizing a horn; sensor means for detecting a monitored action; and a control unit for controlling the alarm circuit so as to intermittently energize the horn when the monitored action is detected by the sensor means during a period of time after an automobile door is locked according to a predetermined procedure and until the automobile door is properly unlocked.

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustrative example, and wherein.

DETAILED DESCRIPTION OF THE EMBODIMENTS

Figure 1:
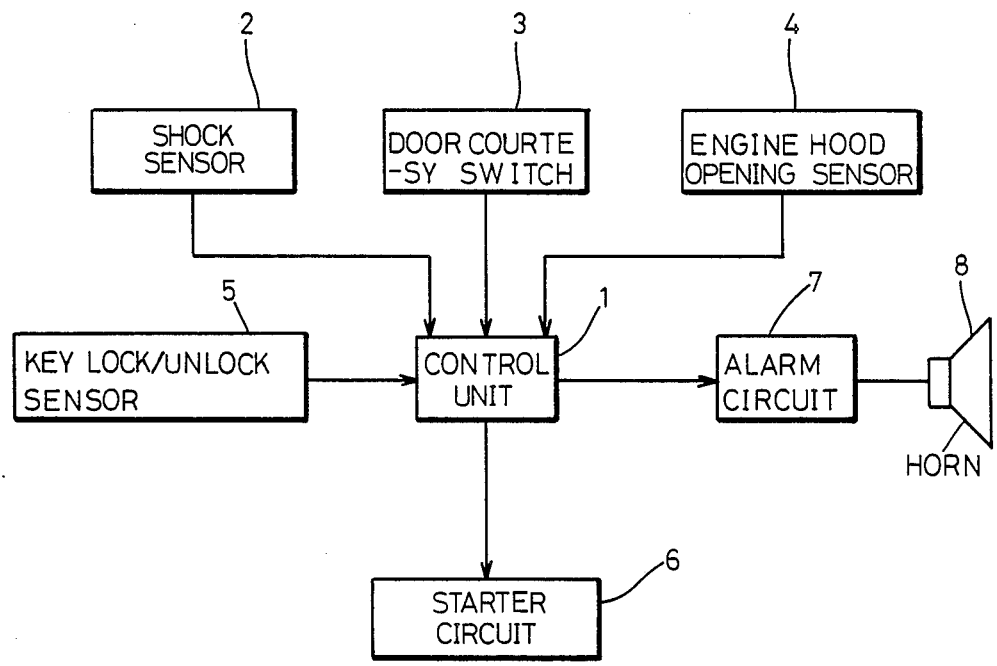
FIG. 1 is a block diagram of an automobile theft prevention device according to an embodiment of the present invention.

FIG. 1 shows in block form an automobile theft prevention device according to an embodiment of the present invention, which is associated with a motor vehicle such as, for example an automobile. The automobile theft prevention device includes a control unit 1 comprising a microcomputer or the like which is supplied with output signals from a shock sensor 2, a door courtesy switch 3, an engine hood opening sensor 4, and a key lock/unlock sensor 5, all of which are installed within the automobile. The shock sensor 2, which serves to monitor a window glass panel for breakage, is mounted upon a lower portion of the window glass panel which is housed within a door of the automobile. The shock sensor 2 detects the breakage of the window glass panel, based upon a change in the acceleration of the window glass panel. The door courtesy switch 3 serves to monitor whether the door is opened or not. The engine hood opening sensor 4 monitors the engine hood in order to determine if it is opened or not. The key lock/unlock sensor 5 detects whether a door lock device is locked or unlocked by means of a key.

A starter circuit 6 includes a starter switch for starting the engine of the automobile and another switch connected to an engine starter, which can be opened and closed by means of an output signal from the control unit 1. An alarm circuit 7 is responsive to a horn starting signal or a horn stopping signal from the control unit 1 in connection with energizing or de-energizing a horn 8. When a monitored action occurs, for example, when the window glass panel is broken, or the door is forced open, or the engine hood is opened, after the door is locked by means of the key, the alarm circuit 7 intermittently energizes the horn 8 in response to an output signal from the control unit 1.

Figure 2:
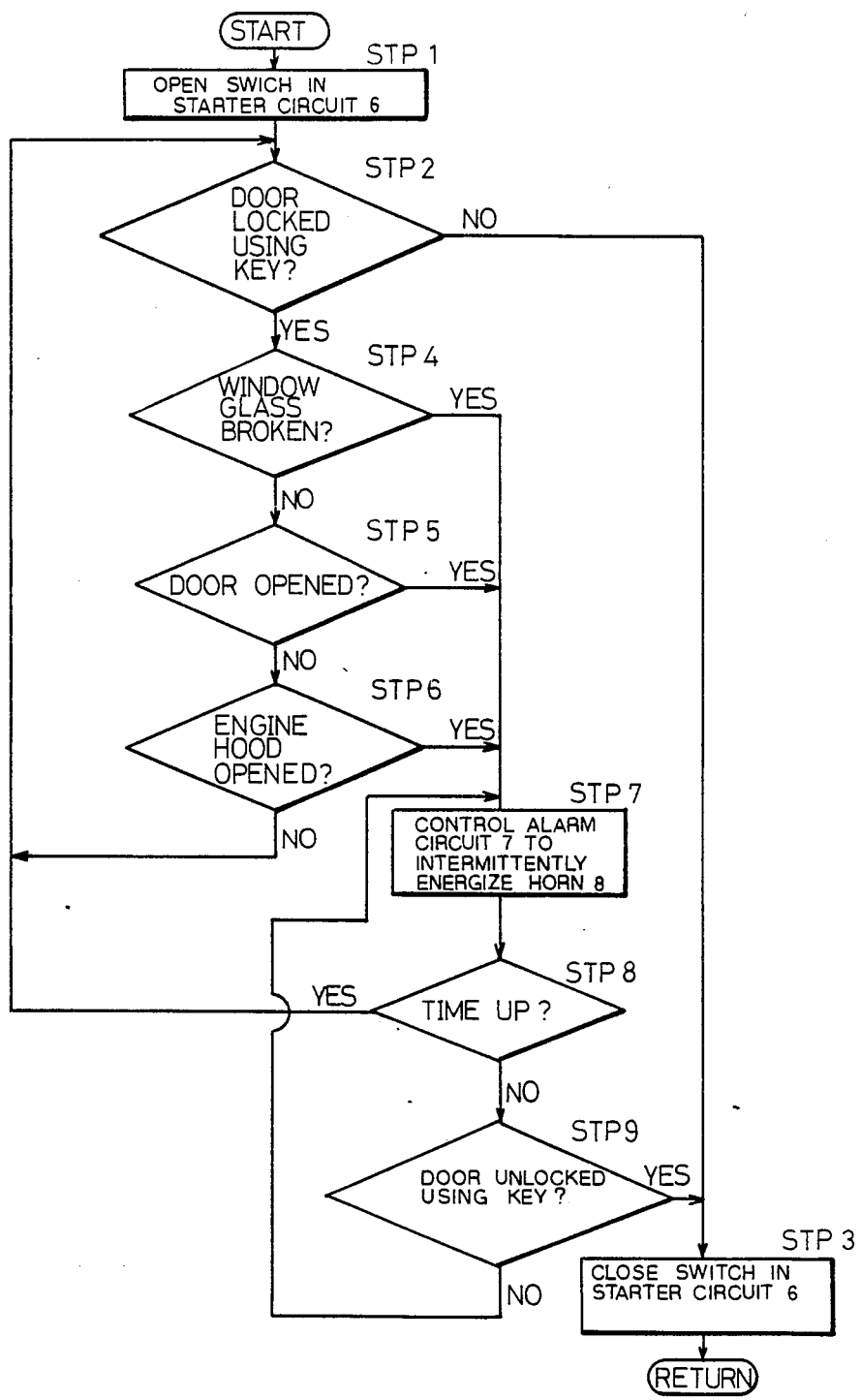
FIG. 2 is a flowchart of an operational sequence of the automobile theft prevention device shown in FIG. 1.

FIG. 2 shows an operational sequence of the automobile theft prevention device illustrated in FIG. 1, according to a predetermined program or routine after the door has been locked using the key. The control unit 1 enters the illustrated operational sequence when it detects an output signal from the key lock/unlock sensor 5 that the door has been locked using the key. Consequently, the switch in the starter circuit 6 which is connected to the engine starter is opened in step 1 so that the engine starter will not be energized even if the starter switch is turned on. Then, step 2 determines whether the door remains locked using the key as indicated by means of the output signal from the key lock/unlock sensor 5. If the door is unlocked using key in the step 2, then the switch in the starter circuit 6 is closed in step 3, and control returns to the normal routine. If the door remains closed in step 2, then control goes to successive steps 4, 5, 6 in order to determine whether monitored actions have occurred based upon output signals from the shock sensor 2, the door courtesy switch 3, and the engine hood open sensor 4. More specifically, step 4 determines whether the window glass panel has been broken, step 5 determines whether the door has been opened, and step 6 determines whether the engine hood has been opened. If none of these monitored actions have taken place, then control goes back to step 2. If any of these monitored actions have occurred, then the alarm circuit 7 intermittently energizes the horn 8 in step 7. Thereafter, step 8 determines whether the intermittent energization of the horn 8 has continued for a predetermined period of time, that is, whether a time up condition has been reached or not, and step 9 determines whether the door has been unlocked using the key. If the answers to the decision steps 8 and 9 are NO, then control returns to step 7 so as to continue the intermittent energization of the horn 8. If the time up condition has been reached in step 8, the horn 8 is de-energized and control goes back to step 2. If the door has been unlocked using the key in step 9, control goes to step 3 disposed within which the switch in the starter circuit 6 is closed, and then control goes back to the normal routine.

Figure 3:
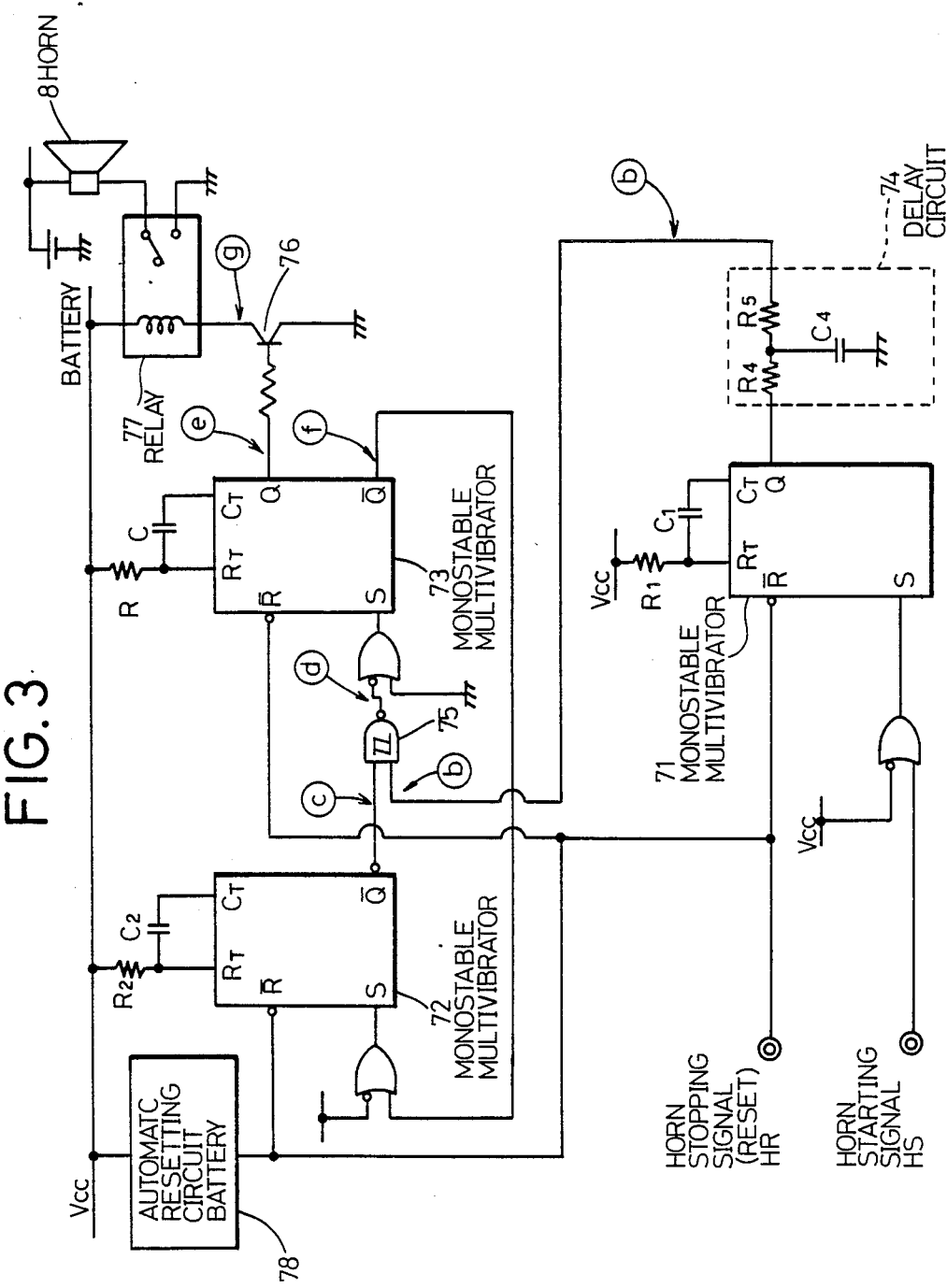
FIG. 3 is a circuit diagram of an alarm circuit and related circuits within an automobile theft prevention device according to another embodiment of the present invention.

FIG. 3 illustrates an alarm circuit and its associated circuits within an automobile theft prevention device according to another embodiment of the present invention. In this embodiment, a control circuit (not shown in FIG. 3) is of a very simple arrangement as it only generates a horn stopping signal and a horn starting signal (described below). Monostable multivibrators 71 through 73 have reset terminals supplied with a horn stopping signal (HR) from the control unit. The horn stopping signal is generated based upon the output signal from the key lock/unlock sensor 5, and is of a high level when the door lock device is locked by means of the key. The monostable multivibrators 71 through 73 are reset when the horn stopping signal is low in level. The monostable multivibrator 71 has a trigger input terminal to which there is applied a horn starting signal (HS) from the control unit. The horn starting signal is produced by ORing the output signals from the shock sensor 2, the door courtesy signal 3, and the engine hood opening sensor 5, and becomes high in level when any one of these sensors detects a monitored action. A Q output signal from the monostable multivibrator 71 is applied through means of a delay circuit 74 to a NAND gate 75. A $\overline{Q}$ output signal from the monostable multivibrator 72 is directly applied to the NAND gate 75. An output signal from the NAND gate 75 is supplied to a trigger input terminal of the monostable multivibrator 73. The monostable multivibrator 72 has a trigger input terminal which is supplied with a $\overline{Q}$ output signal from the monostable multivibrator 73. A Q output signal from the monostable multivibrator 73 alternately turns on and off a switching transistor 76 so as to intermittently energize the horn 8 through means of a relay 77. Denoted at $R_1$ through $R_5$ are resistors, $C_1$ through $C_4$ are capacitors, and 78 is an automatic resetting circuit for resetting the monostable multivibrators 71 through 73 upon detection of an abrupt change in a power supply voltage supplied for thereby preventing the horn 8 from being triggered in error.

Figure 4:
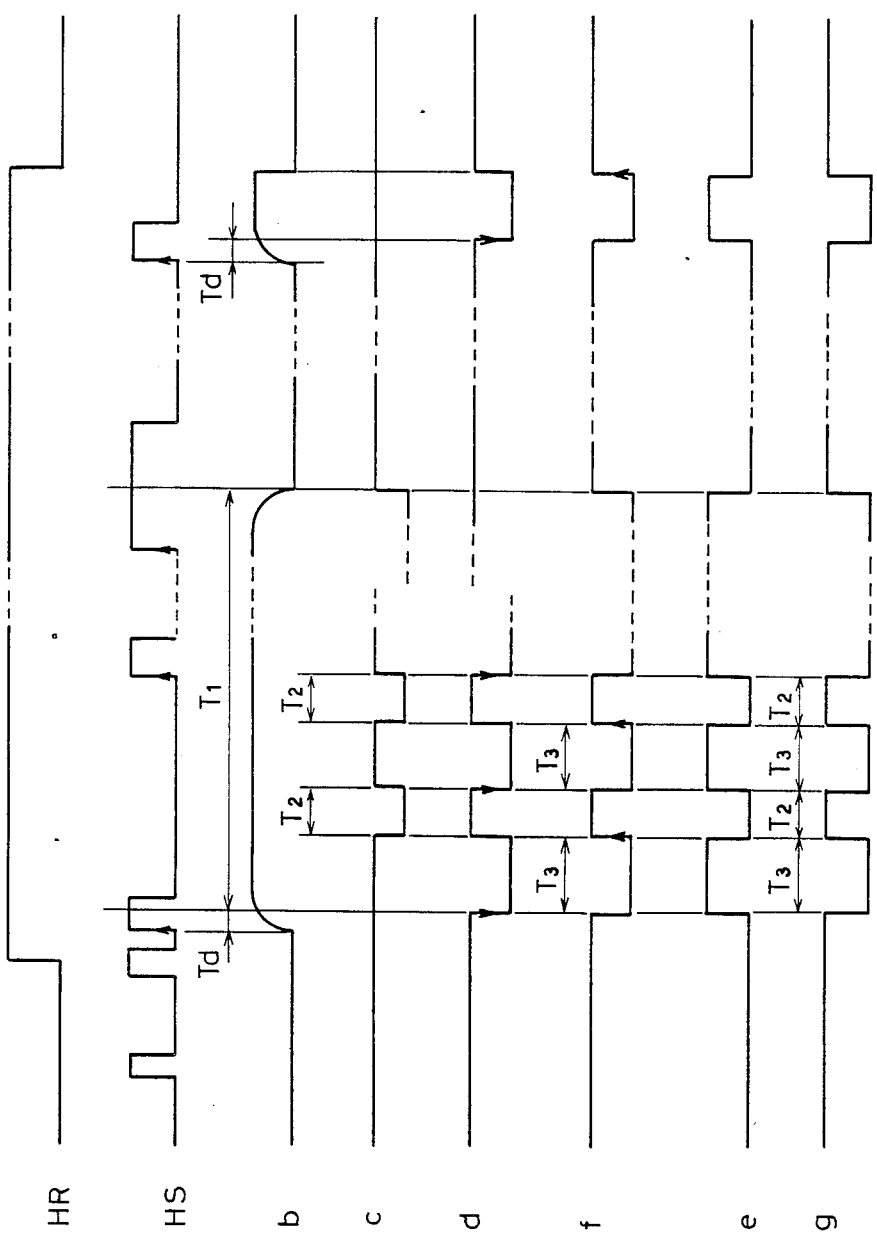
FIG. 4 is a timing chart of signals generated by means of the circuit arrangement shown in FIG. 3.

FIG. 4 is a timing chart of signals at areas b through g in the circuit arrangement shown in FIG. 3 and of the input signals HR, HS. In the embodiment shown in FIG. 3, even if any shock which is produced when the door is legally unlocked using the key is detected by means of the shock sensor and mistaken as window glass breakage by means of the control unit, the delay circuit 74 produces a transient output signal, and the monostable multivibrators are reset by means of the horn stopping signal HR before a time Td elapses. Therefore, the horn 8 is not activated in error during this time Td.

$T_1$ through $T_3$, and Td in FIG. 4 are defined below. The values of the resistors $R_1$ through $R_4$ and the capacitors $C_1$ through $C_4$ are designated by the corresponding reference characters given to these resistors and capacitors.

$T_1$ represents a period of time in which the alarm circuit operates, and which is in proportion to $R_1.C_1$, $T_2$ represents a period of time in which the horn 8 is de-energized, and which is in proportion to $R_2.C_2$, $T_3$ represents a period of time in which the horn 8 is energized, and which is in proportion to $R_3.C_3$, and Td, which is referred to above, is proportional to $R_4.C_4$.

In the above embodiments, the automobile theft prevention device becomes operative (that is, enters the monitoring period) by locking the door with the key. However, the automobile theft prevention device may be arranged so that it becomes operative when the door is locked without a key (keyless locking), or it may enter the monitoring period by means of operating a special switch.

Although certain preferred embodiments have been shown and described, it should be understood that many changes and modifications may be made therein without departing from the scope of the appended claims.

What is claimed is:

1. An automobile theft protection device, comprising:
    an alarm circuit for intermittently energizing an alarm horn;
    sensor means for detecting a monitored action;
    a control unit for controlling said alarm circuit so as to intermittently energize said alarm horn when said monitored action is detected by said sensor means during a period of time after an automobile door is locked according to a predetermined procedure and before said automobile door is properly unlocked;
    a starter circuit including a starter switch connected to an automobile engine starter; and
    means within said control unit for opening said starter switch during said period of time after said automobile door has been locked according to said predetermined procedure and before said automobile door is properly unlocked.

2. An automobile theft prevention device according to claim 1, wherein said sensor means comprises:
    a key lock/unlock sensor for detecting whether a door lock device of said automobile door is locked or unlocked using a key;
    a sensor for detecting whether an automobile window glass panel is broken;
    a door courtesy switch for detecting whether the automobile door is opened; and
    an engine hood opening sensor for detecting whether an automobile engine hood is opened;
    said control unit comprising means for detecting, based on an output signal from said key lock/unlock sensor, whether the control unit is in a monitoring period after the automobile door is locked using a key and until the automobile door is unlocked using the key, for detecting, based on output signals from said sensor for detecting whether the automobile window glass panel is broken, said door courtesy switch, and said engine hood opening sensor, whether a monitored action has occurred, and for controlling said alarm circuit to intermittently energize the horn when the monitored action occurs during said monitoring period.

3. An automobile theft prevention system, comprising:
    an alarm circuit for intermittently energizing an alarm horn (8);
    sensor means for detecting a monitored action;

a control unit for controlling said alarm circuit by intermittently energizing said alarm horn by means of a horn starting signal (HS) when said monitored action is detected by said sensor means during a period of time after an automobile door has been locked according to a predetermined procedure and before said automobile door is properly unlocked, and for de-energizing said alarm horn by means of a horn stopping signal (HR) when said monitored action has not been detected;

first monostable multivibrator means (71) for determining a period of time during which said alarm circuit is operative and having a trigger input terminal (S) for receiving said horn starting signal (HS), a reset terminal (R) for receiving said horn stopping signal (HR), and an output terminal (Q);

second monostable multivibrator means (72) for determining a period of time during which said alarm horn (8) is de-energized and having a trigger input terminal (S), a reset terminal (R) for receiving said horn stopping signal (HR), and an output terminal (Q);

third monostable multivibrator means (73) for determining a period of time during which said alarm horn is energized and having a trigger input terminal (S), a reset terminal (R), a first output terminal (Q), and a second output terminal (Q);

delay circuit means (74) for delaying an output signal from said output terminal (Q) of said first monostable multivibrator means (71);

gate circuit means (75) operatively connected to said delay circuit means (74) and said output terminal (Q) of said second monostable multivibrator means (72);

switching transistor means (76) operatively connected to said first output terminal (Q) of said third monostable multivibrator means (73) for generating an output signal for intermittently energizing said alarm horn (8);

an output signal from said gate circuit means (75) and said horn stopping signal (HR) being respectively supplied to said trigger input terminal (S) and said reset terminal (R) of said third monostable multivibrator means (73) such that a first output signal from said third monostable multivibrator means (73) is transmitted to said switching transistor means (76) while a second output signal from said third monostable multivibrator means (73) is fed back to said trigger input terminal (S) of said second monostable multivibrator (72); and means interconnecting said control unit with said reset terminal (R) of said second monostable multivibrator means (72) for supplying said horn stopping signal (HR) thereto.

4. A system as set forth in claim 3, wherein said sensor means comprises:

a key lock/unlock sensor for detecting whether a door lock device of said automobile door is locked or unlocked by means of a key;

a sensor for detecting whether an automobile window glass panel has been broken;

a door courtesy switch for detecting whether an automobile door has been improperly opened; and an engine hood opening sensor for detecting whether an automobile engine hood has been improperly opened.

5. An automobile theft protection system, comprising:

an alarm circuit for intermittently energizing an alarm horn (8);

sensor means for detecting a monitored action;

a control unit for controlling said alarm circuit by intermittently energizing said alarm horn by means of a horn starting signal (HS) when said monitored action is detected by said sensor means during a period of time after an automobile door has been locked according to a predetermined procedure and before said automobile door is properly unlocked, and for de-energizing said alarm horn by means of a horn stopping signal (HR) when said monitored action has not been detected;

a starter circuit including a starter switch connected to an automobile engine starter;

means within said control unit for opening said starter switch during said period of time after said automobile door has been locked according to said predetermined procedure and before said automobile door is properly unlocked;

first monostable multivibrator means (71) for determining a period of time during which said alarm circuit is operative and having a trigger input terminal (S) for receiving said horn starting signal (HS), a reset terminal (R) for receiving said horn stopping signal (HR), and an output terminal (Q);

second monostable multivibrator means (72) for determining a period of time during which said alarm horn (8) is de-energized and having a trigger input terminal (S), a reset terminal (R) for receiving said horn stopping signal (HR), and an output terminal (Q);

third monostable multivibrator means (73) for determining a period of time during which said alarm horn (8) is energized and having a trigger input terminal (S), a reset terminal (R), a first output terminal (Q), and a second output terminal (Q);

delay circuit means (74) for delaying an output signal received from said output terminal (Q) of said first monostable multivibrator means (71);

gate circuit means (75) operatively connected to said delay circuit means (74) and said output terminal (Q) of said second monostable multivibrator means (72);

switching transistor means (76) operatively connected to said first output terminal (Q) of said third monostable multivibrator means (73) for generating an output signal for intermittently energizing said alarm horn (8);

means interconnecting said gate circuit means (75) and said control unit, respectively, to said trigger input terminal (S) and said reset terminal (R) of said third monostable multivibrator means (73) such that an output signal from said gate circuit means (75) and said horn stopping signal (HR) can be respectively conducted to said trigger input terminal (S) and said reset terminal (R) of said third monostable multivibrator means (73) whereby a first output signal from said first output terminal (Q) of said third monostable multivibrator means (73) can be transmitted to said switching transistor means (76), while a second output signal from said second output terminal (Q) of said third monostable multivibrator means (73) can be fed back to said trigger input terminal (S) of said second monostable multivibrator means (72); and means interconnecting said control unit with said reset terminal (R) of said second monostable multivibrator means (72) for supplying said horn stopping signal (HR) thereto.

6. A system as set forth in claim 5, wherein said sensor means comprises:
a key lock/unlock sensor for detecting whether a door lock device of said automobile door is locked or unlocked by means of a key;
a sensor for detecting whether an automobile window glass panel has been broken;
a door courtesy switch for detecting whether an automobile door has been improperly opened; and
an engine hood opening sensor for detecting whether an automobile engine hood has been improperly opened.

* * * * *